US010664710B2

(12) United States Patent
Hu

(10) Patent No.: US 10,664,710 B2
(45) Date of Patent: May 26, 2020

(54) START INSPECTION METHOD, APPARATUS AND SYSTEM APPLIED TO UNMANNED VEHICLE

(71) Applicant: Baidu Online Network Technology (Beijing) Co., Ltd., Beijing (CN)

(72) Inventor: Taiqun Hu, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 305 days.

(21) Appl. No.: 15/615,676

(22) Filed: Jun. 6, 2017

(65) Prior Publication Data
US 2018/0150702 A1    May 31, 2018

(30) Foreign Application Priority Data

Nov. 30, 2016 (CN) .......................... 2016 1 1083941

(51) Int. Cl.
*G06K 9/00* (2006.01)
*B60W 50/00* (2006.01)
*G01V 1/30* (2006.01)
*G01V 8/00* (2006.01)
*G01V 8/10* (2006.01)
*G06K 9/62* (2006.01)
*H04N 5/232* (2006.01)

(52) U.S. Cl.
CPC ......... *G06K 9/00805* (2013.01); *B60W 50/00* (2013.01); *G01V 1/30* (2013.01); *G01V 8/005* (2013.01); *G01V 8/10* (2013.01); *G06K 9/6201* (2013.01); *H04N 5/23296* (2013.01); *B60W 2554/00* (2020.02)

(58) Field of Classification Search
None
See application file for complete search history.

(56) References Cited

U.S. PATENT DOCUMENTS

2013/0128048 A1    5/2013  Okajima
2017/0313332 A1*  11/2017  Paget ................. B61L 27/0077

FOREIGN PATENT DOCUMENTS

| CN | 103465908 A | * 12/2013 |
| CN | 104149729 A |   11/2014 |
| CN | 105774585 A |   7/2016  |
| CN | 105791687 A |   7/2016  |
| CN | 105828028 A |   8/2016  |

* cited by examiner

Primary Examiner — Wei Wen Yang
(74) Attorney, Agent, or Firm — Knobbe, Martens, Olson & Bear, LLP

(57) ABSTRACT

The present disclosure discolses a start inspection method, apparatus and system applied to an unmanned vehicle. A specific embodiment of the method comprises: acquiring feature information of a bottom area of an unmanned vehicle, in response to receiving a start instruction, the bottom area including a chassis of the unmanned vehicle, ground blocked by the unmanned vehicle and a space between the chassis and the ground; determining whether the acquired feature information matches feature information of the bottom area of the unmanned vehicle collected at a most recent parking; and determining whether there is an object affecting traveling in the bottom area according to a matching result. The embodiment realizes an automatic inspection to the blind zone of the bottom area of the unmanned vehicle when starting the unmanned vehicle and improves the safety performance of the unmanned vehicle.

17 Claims, 4 Drawing Sheets

START INSPECTION METHOD, APPARATUS AND SYSTEM APPLIED TO UNMANNED VEHICLE

CROSS-REFERENCE TO RELATED APPLICATION

This application claims the priority of Chinese Patent Application No. 201611083941.1, entitled "Start Inspection Method, Apparatus and System Applied to Unmanned Vehicle," filed on Nov. 30, 2016, the content of which is incorporated herein by reference in its entirety.

TECHNICAL FIELD

The present disclosure relates to the field of unmanned vehicle technology, specifically to the field of unmanned vehicle inspection technology, and more specifically to a start inspection method, apparatus and system applied to an unmanned vehicle.

BACKGROUND

The unmanned vehicle is a new type of intelligent vehicle, also known as the "wheeled mobile robot." It realizes a fully automatic operation of the vehicle mainly through the ECU (Electronic Control Unit) by precisely controlling and calculating-analyzing the respective parts of the vehicle, and achieves the goal of unmanned driving of the vehicle.

Typically, when starting the vehicle, the driver may survey the surrounding environment and start the vehicle after determining the driving environment is safe. However, this manual inspection method cannot be suitably applied to the unmanned vehicle. Usually the unmanned vehicle is equipped with a sensor at the top and/or on the side of the vehicle for collecting road information during the traveling, but the bottom of the vehicle is still a detection blind zone. Since abnormal condition such as obstruction at the bottom of the vehicle may affect the normal start of the vehicle, failure to detecting the condition at the bottom of the vehicle may result in damage or malfunction upon starting the vehicle, causing security risks.

SUMMARY

The present disclosure provides a start inspection method, apparatus and system applied to an unmanned vehicle, in order to solve one or more of the technical problems mentioned in the foregoing Background section.

In a first aspect, the present disclosure provides a start inspection method applied to an unmanned vehicle. The method comprises: acquiring feature information in a bottom area of an unmanned vehicle, in response to receiving a start instruction, the bottom area including a chassis of the unmanned vehicle, ground blocked by the unmanned vehicle and a space between the chassis and the ground; determining whether the acquired feature information matches feature information of the bottom area of the unmanned vehicle collected at a most recent parking; and determining whether there is an object affecting traveling in the bottom area according to a matching result.

In some embodiments, the determining whether there is an object affecting traveling in the bottom area according to a matching result, including: determining that there is no object affecting traveling in the bottom area, if the acquired feature information matches the feature information of the bottom area of the unmanned vehicle collected at the most recent parking.

In some embodiments, the determining whether there is an object affecting traveling in the bottom area according to a matching result, further including: if the acquired feature information does not match the feature information of the bottom area of the unmanned vehicle collected at the most recent parking, performing the following operations: performing target identification to the acquired feature information to determine attribute information and position information of a target object included in the acquired feature information; determining whether the attribute information and position information of the target object meets a preset condition affecting the traveling; and if affirmative, determining that there is an object affecting the traveling in the bottom area.

In some embodiments, the method further comprises: collecting the feature information of the bottom area of the unmanned vehicle, in response to receiving a parking instruction or detecting that a position of the unmanned vehicle has not changed during a preset time period; and storing the collected feature information.

In some embodiments, the method further comprises: when there is no object affecting the traveling in the bottom area, starting the unmanned vehicle; and when there is an object affecting the traveling in the bottom area, issuing an alarm message.

In some embodiments, the feature information includes at least one of the following: image information, laser point cloud data, millimeter wave data and ultrasonic data.

In a second aspect, the present disclosure provides a start inspection apparatus applied to an unmanned vehicle. The apparatus comprises: an acquisition unit, configured to acquire feature information of a bottom area of an unmanned vehicle, in response to receiving a start instruction, the bottom area including a chassis of the unmanned vehicle, ground blocked by the unmanned vehicle and a space between the chassis and the ground; a matching unit, configured to determine whether the acquired feature information matches feature information of the bottom area of the unmanned vehicle collected at a most recent parking; and a determining unit, configured to determine whether there is an object affecting traveling in the bottom area according to a matching result.

In some embodiments, the determining unit is further configured to determine whether there is an object affecting traveling in the bottom area according to the following method: determine that there is no object affecting traveling in the bottom area, if the acquired feature information matches the feature information of the bottom area of the unmanned vehicle collected at the most recent parking.

In some embodiments, the determining unit is further configured to determine whether there is an object affecting traveling in the bottom area according to the following method: if the acquired feature information does not match the feature information of the bottom area of the unmanned vehicle collected at the most recent parking, perform the following operations: performing target identification to the acquired feature information to determine attribute information and position information of the target object included in the acquired feature information; determining whether the attribute information and position information of the target object meets a preset condition of traveling affecting; and in the affirmative, determining that there is an object affecting traveling in the bottom area.

In some embodiments, the apparatus further comprises: a collection unit, configured to collect the feature information of the bottom area of the unmanned vehicle, in response to receiving a parking instruction or detecting that a position of the unmanned vehicle has not changed during a preset time period; and a storing unit, configured to store the collected feature information.

In some embodiments, the apparatus further comprises: a starting unit, configured to start the unmanned vehicle, when there is no object affecting traveling in the bottom area; and an alarming unit, configured to issue an alarm message, when there is an object affecting traveling in the bottom area.

In some embodiments, the feature information includes at least one of the following: image information, laser point cloud data, millimeter wave data and ultrasonic data.

In a third aspect, the present disclosure provides a start detection system applied to an unmanned vehicle. The system comprises: a sensor, for collecting feature information of a bottom area of an unmanned vehicle, the bottom area including a chassis of the unmanned vehicle, ground blocked by the unmanned vehicle and a space between the chassis and the ground; a processor, for acquiring the feature information of the bottom area of the unmanned vehicle collected by the sensor, in response to receiving a start instruction, determining whether the acquired feature information matches feature information of the bottom area of the unmanned vehicle collected at a most recent parking, and determining whether there is an object affecting traveling in the bottom area according to a matching result.

In some embodiments, the system further comprises: a controller, configured to control the sensor to rotate, stretch and translate.

In some embodiments, the sensor includes at least one of the following: a camera, a laser radar, a millimeter wave radar and an ultrasonic radar.

By acquiring feature information of a bottom area of an unmanned vehicle when receiving a start instruction, then comparing the acquired feature information of the bottom area of the unmanned vehicle with feature information of the bottom area of the unmanned vehicle collected at a most recent parking, determining whether the acquired feature information matches the feature information of the most recent parking, and determining whether there is an object affecting traveling in the bottom area according to a matching result, the start inspection method, apparatus and system applied to an unmanned vehicle provided by the present disclosure realizes an automatic inspection to the blind zone in the bottom area of the unmanned vehicle when starting the unmanned vehicle and improves the safety performance of the unmanned vehicle.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
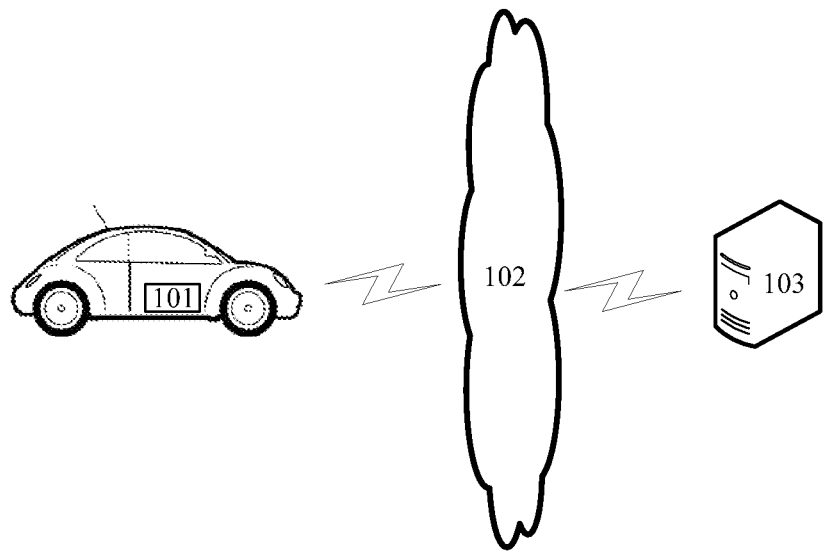
FIG. 1 is an exemplary system architecture diagram in which the present disclosure may be applied.

FIG. 1 shows an exemplary system architecture 100 of an embodiment of the start inspection method or apparatus applied to an unmanned vehicle of the present disclosure.

As shown in FIG. 1, the system architecture 100 may include a vehicle-mounted terminal vehicle 101, a network 102 and a cloud server 103. The network 102 serves as a medium providing a communication link between the vehicle-mounted terminal vehicle 101 and the server 103. The network 102 may include various types of connections, such as wireless communication links, a global positioning system or optical fibers and the like.

The vehicle-mounted terminal vehicle 101 may be mounted with a control system of the unmanned vehicle which may interact directly with the server 103 through the network 102. The vehicle-mounted terminal device 101 may also be connected to various sensors for detecting a vehicle operating condition, for providing information input and displaying a display screen and so on.

The server 103 may be a server for storing data, for example, a server that receives and stores information transmitted from the vehicle-mounted terminal device 101. The server 103 may receive information transmitted from one or a plurality of vehicle-mounted terminal devices 101 and store the received information in association with identification information of the vehicle-mounted terminal device 101.

It should be noted that the start detection method applied to an unmanned vehicle provided by the present disclosure embodiment is generally performed by the vehicle-mounted terminal device 101, and accordingly, the start inspection apparatus applied to an unmanned vehicle is generally provided in the vehicle-mounted terminal device 101.

It should be appreciated that the numbers of the vehicle-mounted terminal devices, the networks and the servers in FIG. 1 are merely illustrative. Any number of terminal devices, networks and servers may be provided based on the actual requirements.

Figure 2:
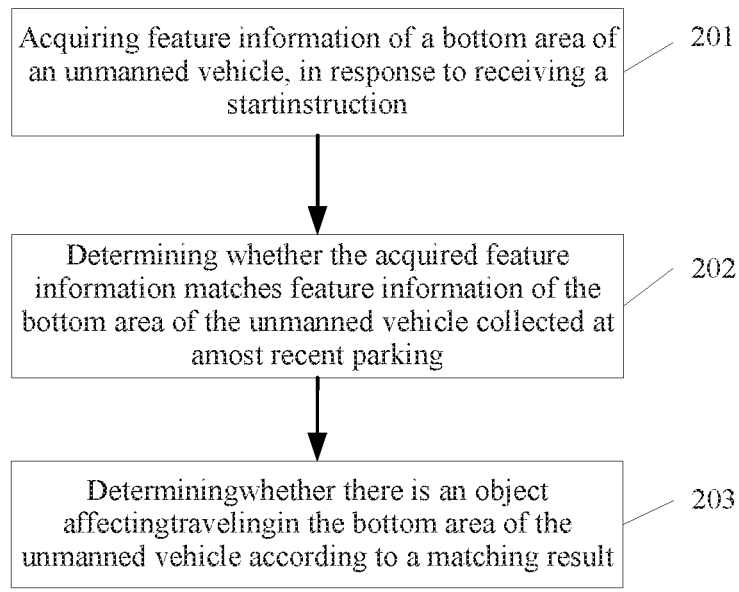
FIG. 2 is a flowchart of an embodiment of a start inspection method applied to an unmanned vehicle according to the present disclosure.

With further reference to FIG. 2, a flow 200 of an embodiment of the start inspection method applied to an unmanned vehicle according to the present disclosure is shown.

Step 201, acquiring feature information of a bottom area of an unmanned vehicle, in response to receiving a start instruction.

In the present embodiment, the bottom of the unmanned vehicle may have a bottom sensor for collecting feature information of the bottom area. Wherein the bottom area may be a blind zone at the bottom of the vehicle and may include the chassis of the unmanned vehicle, ground blocked by the unmanned vehicle and a space between the chassis of the unmanned vehicle and the ground blocked by the unmanned vehicle. Wherein the ground blocked by the unmanned vehicle is not limited to a ground area included in the upper space of the unmanned vehicle and blocked when being viewed at a 90° angle perspective with respect to the ground, and may also include a ground area at the upper or body side of the unmanned vehicle and blocked when being viewed at an acute angle perspective with respect to the ground.

Typically, the chassis is located at the bottom of the unmanned vehicle and may include components such as an engine, a clutch, a transmission, a diverter, a brake and a lever, for bearing the vehicle body and controlling the state of the vehicle. The ground blocked by the unmanned vehicle may have information related to the unmanned vehicle, such as an oil presence on the ground when the vehicle is leaking. There may be obstacles affecting normal traveling of the vehicle on the ground blocked by the unmanned vehicle, and in the space between the chassis of the unmanned vehicle and the ground blocked by the unmanned vehicle.

The electronic device (e.g., the vehicle-mounted terminal device 101 as shown in FIG. 1) on which the start inspection method applied to an unmanned vehicle operate may be connected to a bottom sensor mounted on the bottom of the unmanned vehicle. Upon receipt of the start instruction, the electronic device may begin to detect the environmental information of the vehicle, and the bottom sensor may be started and the current feature information of the bottom area may be collected with the bottom sensor.

The bottom sensor may be in a variety of forms, including but is not limited to, one or more of a camera, a laser radar, a millimeter wave radar and an ultrasonic radar. The feature information of the bottom area may be information that characterizes the state feature of the bottom area, and accordingly, the feature information may include, but is not limited to, one or more of image information, laser point cloud data, millimeter wave data and ultrasonic data.

In some alternative implementations, the bottom sensor of the unmanned vehicle may be connected to a control component. For example, the bottom sensor may be connected to a stretching component, a rotating component and a translating component, wherein the stretching component may control the bottom sensor to stretch perpendicular to the ground or perpendicular to the chassis. The rotating component may control the bottom sensor to rotate in the bottom area. The translating component may control the bottom sensor to translate in a direction parallel to the ground or parallel to the chassis. These control components may control the bottom sensor to collect feature information from different angles of view, in different positions in the bottom area to obtain a complete and accurate inspection result.

The electronic device may acquire the feature information of the bottom area collected from the sensor at the bottom by a connection established with the sensor at the bottom.

Alternatively, the bottom of the unmanned vehicle has a plurality of sensors, and the electronic device may acquire the feature information collected by the plurality of sensors.

Step 202, determining whether the acquired feature information matches feature information of the bottom area of the unmanned vehicle collected at a most recent parking.

In the present embodiment, the unmanned vehicle may collect feature information of the bottom area of the parking position when parking. Specifically, the electronic device may control the bottom sensor to collect the current feature information of the bottom area after the vehicle has stopped running for a certain period of time or after detecting the parking instruction. After that, the feature information of the bottom area collected at parking may be stored locally or upload to the server.

After the start instruction is detected and the current feature information of the bottom area is collected in step 201, the currently acquired feature information of the bottom area may be matched with the feature information of the bottom area collected at the last parking. Specifically, if the above bottom sensor includes a plurality of types of sensors, such as including a camera and a laser radar, the feature information of the bottom area collected by the corresponding sensors may be matched. For example, historical image information collected by the camera at the bottom of the last parking and historical laser point cloud data collected by the laser radar at the bottom may be matched with the current image information collected by the camera at the bottom after the start instruction is currently inspected and the current laser radar data collected by the laser radar at the bottom.

The feature information of the bottom area acquired in step 201 may be matched with the feature information of the bottom area collected at the last parking adopting a plurality of matching methods. For example, when the image information is matched, greyscale data of each corresponding pixel point in the image may be matched, or feature vector may be extracted from the image. If the feature vectors extracted from the two images matches, the two images are determined as matched. When matching the laser point cloud data, it can be determined whether the points corresponding to the three-dimensional coordinates in the two sets of laser point cloud data coincide, in the affirmative, it is considered that the two sets of laser point cloud data matches.

Step 203, determining whether there is an object affecting traveling in the bottom area according to a matching result.

The electronic device may determine whether there is an object affecting traveling in the bottom area of the unmanned vehicle according to the matching result of step 203. The object affecting traveling may be a pre-defined object, for example, an object that may affect the safety state of the vehicle, such as a large volume obstacle, a component of the vehicle, an oil presence on the ground.

In some embodiments, if the matching result of step 202 is that the acquired feature information matches the feature information of the bottom area of the unmanned vehicle collected at the most recent parking, it may be determined that there is no object affecting traveling in the bottom area of the unmanned vehicle. Under normal circumstances, if the vehicle can be normally parked, it is considered that the bottom area of the vehicle is in a safe state at parking. It is considered that the bottom area of the vehicle is in a safe state, when it is detected that the current state of the bottom area of the vehicle is the same as the state of the bottom area of the vehicle at the last parking before the vehicle is started.

In a further embodiment, it is also possible to determine whether there is an object affecting traveling in the bottom area by the following method: if the feature information acquired in step 201 does not match the feature information of the bottom area of the unmanned vehicle collected at the most recent parking, performing the following operation: performing target identification to the acquired feature information to determine attribute information and position information of the target object included in the acquired feature information; determining whether the attribute information and position information of the target object meets a preset condition of traveling affecting; and in the affirmative, determining that there is an object affecting traveling in the bottom area.

Specifically, for the plurality of types of feature information of the bottom area of the vehicle acquired in step 201, corresponding target identification methods may be respectively adopted to extract target objects therein and the attribute information and the position information of the target objects may be further analyzed. Here, the attribute information is inherent attribute information such as the type, size, function and the like of the target object, and the position information may be the geographical position of the target object, and may be absolute position information such as a coordinate point, or relative position information of the vehicle. For example, for the image information acquired in step 201, an algorithm such as edge extraction may be adopted to extract a target object of a relatively simple outline in the image, calculate the size of the target object, determine the attribute feature of the target object according to its color and other features, determine the position of the target object in the image, and further calculate a relative position of the target object and the vehicle. The filter, the SIFT (Scale-invariant Feature Transform) and other methods may be adopted to extract features of the image. The extracted feature is matched with the feature of the preset target object library to obtain the attribute information of the target object contained in the image, and the relative position of the target object and the vehicle may also be calculated according to the position of the target object in the image. Alternatively, in some embodiments, the attribute information and the position information of the target object may be determined by using multi-frame image or a plurality of sets of radar data.

The preset conditions affecting traveling may be stored in advance in the electronic device. Here, these preset conditions are related to the attribute information and position information of the object. For example, the preset condition may be an object whose size is larger than the size threshold, with a relative distance from the vehicle smaller than the distance threshold, located in a preset area at the bottom of the vehicle, belonging to a preset type and the like. For example, the preset condition may be that the identified target object is an animal, there is liquid falling from the chassis of the unmanned vehicle to the ground and so on. Further, the electronic device may determine whether the attribute information and the position information of the target object meet the preset conditions. In the affirmative, it may be determined that there is an object affecting traveling in the bottom area of the unmanned vehicle, otherwise it may be determined that there is no object affecting traveling in the bottom area of the unmanned vehicle.

In addition, the situation of the bottom area may also be analyzed based on a difference between the feature information of the bottom area acquired in step 201 and the feature information of the bottom area of the unmanned vehicle collected at the most recent parking. For example, the difference image of two images may be set as the target object and an image identification is performed to the target image, thus reducing the amount of image information to be calculated and the complexity of identifying the target object, which is in favor of improving the speed of identification.

In some alternative implementations of the present embodiment, the start inspection method applied to an unmanned vehicle also includes: when there is no object affecting traveling in the bottom area of the unmanned vehicle, starting the unmanned vehicle; and when there is an object affecting traveling in the bottom area, issuing an alarm message. If it is determined that there is no object affecting traveling in the bottom area in step 203, the bottom area is in a safe state, and the electronic device may issue an ignition instruction to the vehicle's transmitter to start the vehicle. If it is determined that there is an object affecting traveling in the bottom area in step 203, the electronic device may prohibit the engine from igniting and issue an alarm sound to alert the passenger of an abnormal state in the bottom of the vehicle. In this way, it can be ensured that the vehicle can only be activated in a safe state, and the safety performance of the unmanned vehicles is enhanced.

Figure 3:
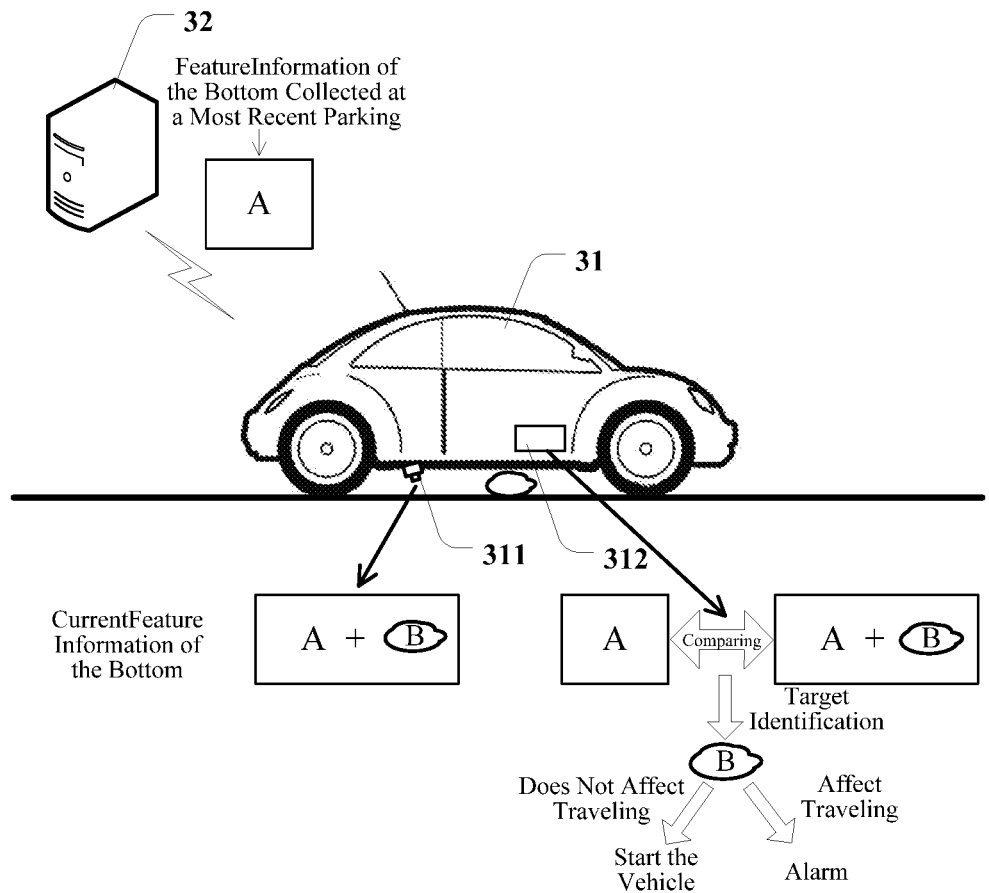
FIG. 3 is a schematic diagram of an application scenario of the start inspection method applied to an unmanned vehicle according to the present disclosure.

With reference to FIG. 3, a schematic diagram of an application scenario of the start inspection method applied to an unmanned vehicle is shown. As shown in FIG. 3, before starting the unmanned vehicle 31, the vehicle-mounted terminal device 312 acquires the feature information A+B of the bottom area by the sensor 311 at the bottom of the vehicle, then issues a request to the server 32 to acquire the feature information A of the bottom area collected by the sensor 311 at the last parking, and then compares the feature information A of the bottom area collected by the sensor 311 at the last parking with the feature information A+B of the bottom area acquired by the sensor 311 at the current bottom. The result of the comparison is that a target object B exists in the current bottom area, and then the attribute and the position of the target object B can be analyzed. Then, it is to be determined that whether the target object B affects the traveling of the vehicle, if the traveling will be affected, an alarm information is issued, for example, when there is a large stone at the bottom of the car, the passenger may be reminded that it is not safe to start the vehicle, so that the passenger may take appropriate measures; if the target object B does not affect the traveling, the vehicle-mounted terminal device may control the ignition system to start the vehicle.

The start inspection method applied to an unmanned vehicle provided by the present application embodiment, by acquiring feature information of the bottom area of the unmanned vehicle, in response to receiving a start instruction, comparing the acquired feature information of the bottom area of the unmanned vehicle with the feature information of the bottom area of the unmanned vehicle collected at the last parking, determining whether the acquired feature information matches feature information of the bottom area of the unmanned vehicle collected at a most recent parking, and determining whether there is an object affecting traveling at the bottom area according to a matching result, realizes an automatic inspection to the blind zone in the bottom area of the unmanned vehicle when starting the unmanned vehicle and improves the safety performance of the unmanned vehicle.

In some alternative implementations, the start inspection method of an unmanned vehicle may further include the following steps: collecting feature information of the bottom area of the unmanned vehicle, in response to receiving the parking instruction or detecting that the position of the unmanned vehicle has not changed during a preset duration; storing the collected feature information. Upon detecting the unmanned vehicle receiving the parking instruction, current feature information of the bottom area may be detected as the matching benchmark for the next start of the vehicle and saved to the above electronic device locally. Upon detecting the geographic position of the unmanned vehicle does not change in the preset time duration, it may be determined that the vehicle is in a parking state, and the feature information of the bottom area may also be collected by the bottom sensor and stored locally. The preset time during may be a period of time after the detection of the parking instruction, for example, 5 minutes. Alternatively, the saved feature information of the bottom area may be deleted after the unmanned vehicle is started. In this way, when the unmanned vehicle is started, the feature information of the bottom area collected at the last parking may also be acquired without liking to the internet, to compare with the current feature information of the bottom area to automatically detect whether the bottom area is in a safe state.

Figure 4:
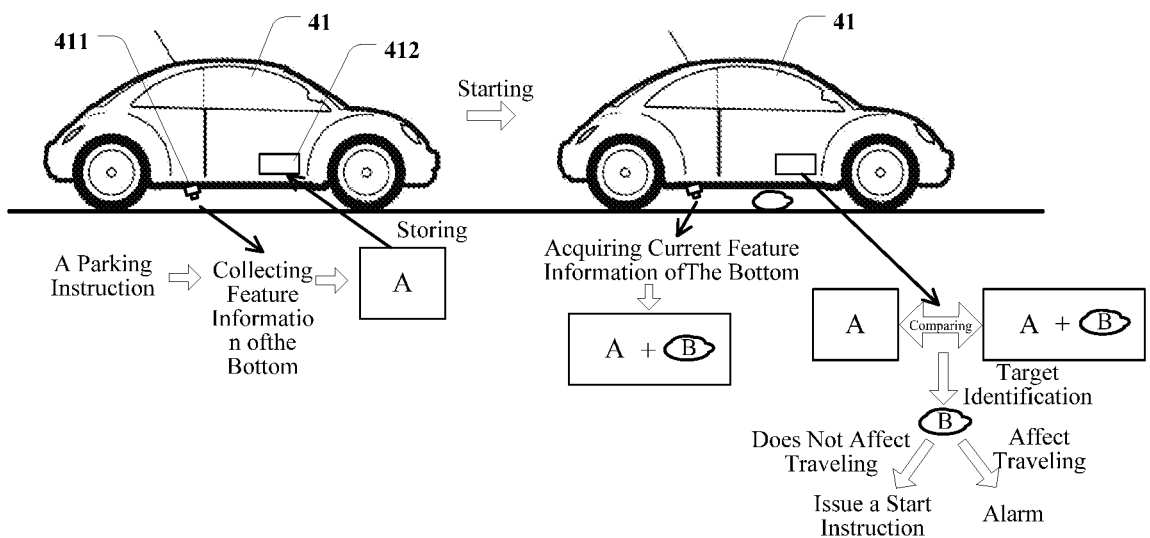
FIG. 4 is a schematic diagram of another application scenario of the start inspection method applied to an unmanned vehicle according to the present disclosure.

With reference to FIG. 4, a schematic diagram of another application scenario of the start inspection method applied to an unmanned vehicle is shown.

As shown in FIG. 4, which is different from the scenario shown in FIG. 3, after detecting the parking instruction, the vehicle-mounted terminal device 412 may start the bottom sensor 411 to collect the feature information of the bottom area at parking and store the collected feature information A to the vehicle-mounted terminal device. After receiving the start instruction, the unmanned vehicle 41 may compare the feature information of the bottom area stored in the vehicle-mounted terminal device with the current feature information A+B of the bottom area collected by the bottom sensor 411. It is also possible to detect whether there is an object affecting traveling at the bottom area when the vehicle-mounted terminal device 412 is not connected to the internet, which further ensures the accuracy of the detection result.

Figure 5:
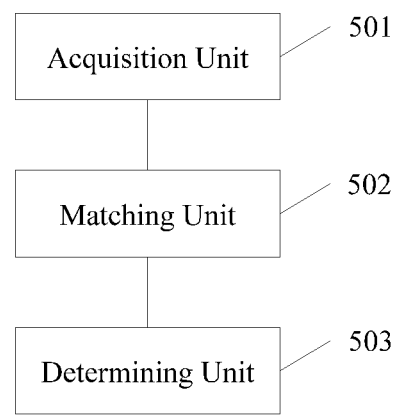
FIG. 5 is a schematic structural diagram of an embodiment of a start inspection apparatus applied to an unmanned vehicle according to the present disclosure.

With further reference to FIG. 5, as an implementation to the method illustrated in the above figures, the present disclosure provides an embodiment of a start inspection apparatus applied to an unmanned vehicle. The apparatus embodiment corresponds to the method embodiment shown in FIG. 2, and the apparatus may be specifically applied to the vehicle-mounted terminal device (e.g., the vehicle-mounted brain).

As shown in FIG. 5, the start inspection apparatus 500 applied to an unmanned vehicle includes an acquisition unit 501, a matching unit 502 and a determining unit 503. The acquisition unit 501 is configured to acquire feature information of a bottom area of an unmanned vehicle, in response to receiving a start instruction, wherein the bottom area includes a chassis of the unmanned vehicle, ground blocked by the unmanned vehicle and a space between the chassis and the ground. The matching unit 502 is configured to determine whether the acquired feature information matches feature information of the bottom area of the unmanned vehicle collected at a most recent parking. The determining unit 503 is configured to determine whether there is an object affecting traveling in the bottom area according to a matching result.

In the present embodiment, the bottom area of the unmanned vehicle may be provided with a bottom sensor, which may be a camera, a laser radar, a millimeter wave radar, an ultrasonic radar, etc. The acquisition unit 501 may be connected to the bottom sensors of the vehicle and issue a request to each sensor, and the sensors may transmit the collected feature information of the bottom area to the acquisition unit 501. Accordingly, the feature information of the bottom area may include but is not limited to image information, laser point cloud data, millimeter wave data and one or more of ultrasonic data.

The matching unit 502 may match the feature information acquired by the acquisition unit 501 with feature information of the bottom of the vehicle at the most recent parking pre-stored or received from the server, and the specific matching method may be, for example, feature point matching, similarity calculation, etc.

The determining unit 503 may analyse and determine whether there is an object affecting traveling in the bottom area of the vehicle according to the matching result of the matching unit 502. Specifically, if the matching result of the matching unit 502 is that the feature information acquired by the acquisition unit 501 matches the feature information of the bottom area of the unmanned vehicle collected at the most recent parking, the determining unit 503 may determine that there is no object affecting traveling in the bottom area. If the matching result of the matching unit 502 is that the feature information acquired by the acquisition unit 501 does not match the feature information of the bottom area of the unmanned vehicle collected at the most recent parking, method such as target identification may be further adopted to extract and identify target objects in the bottom feature area.

In some embodiments, the determining unit 503 is further configured to determine whether there is an object affecting traveling in the bottom area according to the following method: if the acquired feature information does not match the feature information of the bottom area of the unmanned vehicle collected at the most recent parking, perform the following operations: performing target identification to the acquired feature information to determine attribute information and position information of the target object included in the acquired feature information; determining whether the attribute information and position information of the target object meets a preset condition of traveling affecting; and in the affirmative, determining that there is an object affecting traveling in the bottom area. Here, the object affecting traveling may be an obstacle, an automobile malfunction related object (e.g., gasoline), etc.

In some embodiments, the apparatus 500 further includes a collection unit and a storing unit. The collection unit is configured to collect the feature information of the bottom area of the unmanned vehicle, in response to receiving a parking instruction or detecting that a position of the unmanned vehicle has not changed during a preset time period. The storing unit is configured to store the feature information collected by the collection unit. That is, the collection unit is used to collect the feature information of the bottom area when the vehicle is parked, and the storing unit is used to store the feature information.

In some embodiments, the apparatus 500 further includes a starting unit and an alarming unit. The starting unit is configured to start the unmanned vehicle, when it is determined by the determining unit 503 that there is no object affecting traveling in the bottom area. The alarming unit is configured to issue an alarm message, when it is determined by the determining unit 503 that there is an object affecting traveling in the bottom area.

It should be understood that the units described in the apparatus 500 correspond to the respective steps in the method described with reference to FIG. 2. Thus, the operations and features described above for the start inspection method applied to the unmanned vehicle are equally applicable to the apparatus 500 and the units contained therein, and will not be further described. The corresponding units in the apparatus 500 may cooperate with the units in the vehicle-mounted terminal device to implement the solution of the present disclosure embodiment.

The start inspection apparatus applied to an unmanned vehicle provided by the embodiment of the present disclosure may perform a safety inspection to the bottom blind zone of the vehicle after the start instruction is received, and before the unmanned vehicle is started, thereby enhancing the safety performance of the unmanned vehicle.

Figure 6:
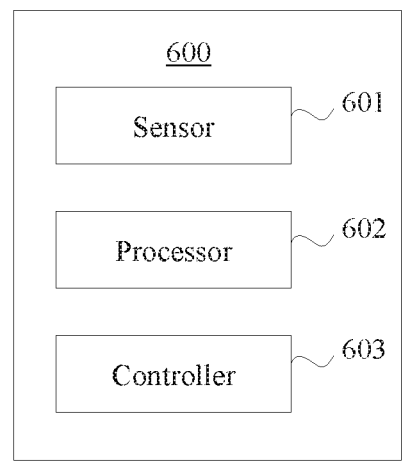
FIG. 6 is a schematic structural diagram of an embodiment of a start inspection system applied to an unmanned vehicle according to the present disclosure.

FIG. 6 is a schematic structural diagram of an embodiment of a start inspection system applied to an unmanned vehicle according to the present disclosure.

As shown in FIG. 6, the start inspection system 600 applied to an unmanned vehicle provided by the present disclosure includes a sensor 601 and a processor 602. The sensor 601 may be installed at the bottom area of the unmanned vehicle, for collecting feature information of the bottom area of the unmanned vehicle, the bottom area including a chassis of the unmanned vehicle, ground blocked by the unmanned vehicle and a space between the chassis and the ground. The processor 602 may be used for performing the method flow 200 described above in combining with FIG. 2, specifically for acquiring the feature information of the bottom area of the unmanned vehicle collected by the sensor, in response to receiving a start instruction, determining whether the acquired feature information matches feature information of the bottom area of the unmanned vehicle collected at a most recent parking, and determining whether there is an object affecting traveling in the bottom area of the unmanned vehicle according to a matching result.

The sensor 601 may be fixedly mounted on the chassis of the vehicle. Alternatively, the sensor 601 may be a miniature sensor and may be mounted on a tire of the vehicle. The sensor 601 may include but is not limited to at least one of the following: a camera, a laser radar, a millimeter wave radar and an ultrasonic radar.

In some embodiments, the system 600 further includes a controller 603, configured to control the sensor 601 to rotate, stretch and translate. The controller 603 may control a mechanical control component connected to the sensor, which may include a stretching rod, a rotating member and a translating member. The controller 603 may issue instructions to these mechanical control components to control the sensor 601 to collect the feature information of the respective positions and the respective angles in the bottom area.

The start inspection system 600 applied to an unmanned vehicle provided by the present disclosure, combines a sensor at the bottom of the vehicle and a processor that may be provided in the vehicle-mounted terminal device, enables safety inspection to the bottom blind zone of the vehicle, avoids safety risks brought by obstacles at the bottom of the vehicle such as objects affecting traveling when the vehicle is started.

Figure 7:
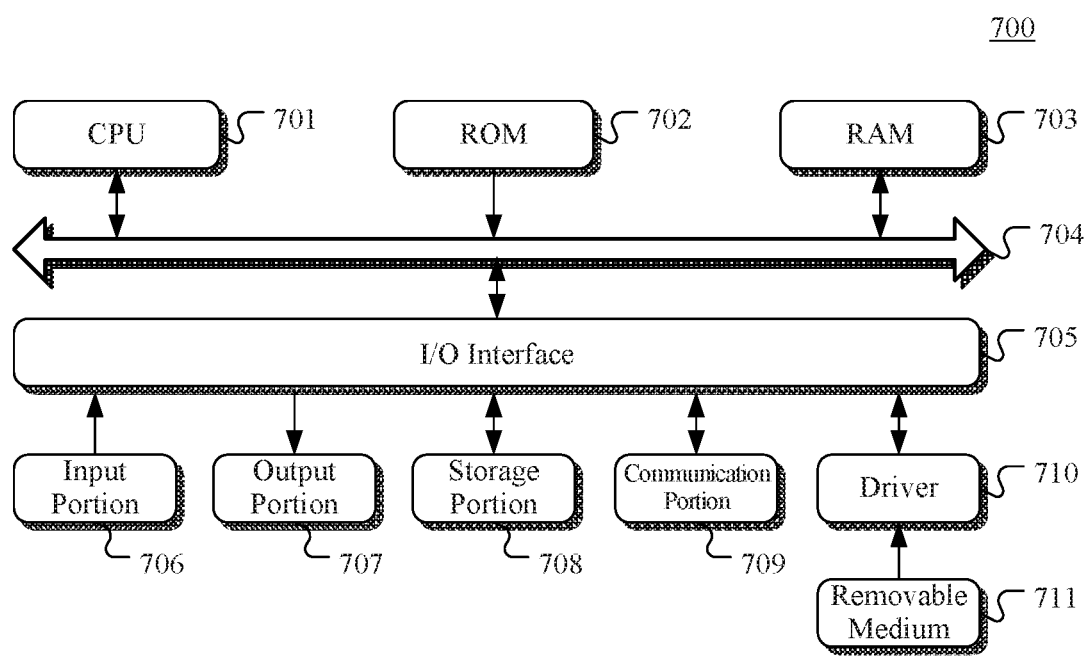
FIG. 7 is a schematic structural diagram of a computer system adapted to implement a vehicle-mounted terminal device of embodiments of the present disclosure.

Referring to FIG. 7, a schematic structural diagram of a computer system 700 adapted to implement an on-board terminal device of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquiring unit, a matching unit and a determining unit, where the names of these units or modules are not considered as a limitation to the units or modules. For example, the acquiring unit may also be described as "a unit for acquiring feature information in a bottom area of an unmanned vehicle, in response to receiving a start instruction."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquiring feature information in a bottom area of an unmanned vehicle, in response to receiving a start instruction, the bottom area including a chassis of the unmanned vehicle, ground blocked by the unmanned vehicle and a space between the chassis and the ground; determining whether the acquired feature information matches feature information of the bottom area of the unmanned vehicle collected at a most recent parking; and determining whether there is an object affecting traveling in the bottom area according to a matching result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A start inspection method for an unmanned vehicle, the method comprising:
   acquiring feature information in a bottom area of an unmanned vehicle, in response to receiving a start instruction, the bottom area including a chassis of the unmanned vehicle, ground blocked by the unmanned vehicle and a space between the chassis and the ground, wherein a piece of the feature information is collected by a bottom sensor translating parallel to the chassis, the bottom sensor being mounted on the bottom of the unmanned vehicle via a translating component, the translating component controls the bottom sensor to translate in a direction parallel to the chassis;
   determining whether the acquired feature information matches feature information of the bottom area of the unmanned vehicle collected at a most recent parking; and
   determining whether there is an object affecting traveling in the bottom area according to a matching result.

2. The method according to claim 1, wherein the determining whether there is an object affecting traveling in the bottom area according to a matching result, comprises:
   determining that there is no object affecting the traveling in the bottom area, in response to the acquired feature information matching the feature information of the bottom area of the unmanned vehicle collected at the most recent parking.

3. The method according to claim 2, wherein the determining whether there is an object affecting traveling in the bottom area according to a matching result, further comprises:
   in response to the acquired feature information not matching the feature information of the bottom area of the unmanned vehicle collected at the most recent parking, performing following operations:
       performing target identification on the acquired feature information to determine attribute information and position information of a target object included in the acquired feature information;
       determining whether the attribute information and position information of the target object meets a preset condition affecting the traveling; and
       in response to affirmative, determining that there is an object affecting the traveling in the bottom area.

4. The method according to claim 1, the method further comprising:
   collecting the feature information of the bottom area of the unmanned vehicle, in response to receiving a parking instruction or detecting that a position of the unmanned vehicle has not changed during a preset time period; and
   storing the collected feature information.

5. The method according to claim 1, the method further comprising:
   when there is no object affecting the traveling in the bottom area, starting the unmanned vehicle; and
   when there is an object affecting the traveling in the bottom area, issuing an alarm message.

6. The method according to claim 1, wherein the feature information comprises: image information, laser point cloud data, millimeter wave data and ultrasonic data.

7. A start inspection apparatus for an unmanned vehicle, the apparatus comprising:
   at least one processor; and
   a memory storing instructions, which when executed by the at least one processor, cause the at least one processor to perform operations, the operations comprising:
   acquiring feature information of a bottom area of an unmanned vehicle, in response to receiving a start instruction, the bottom area including a chassis of the unmanned vehicle, ground blocked by the unmanned vehicle and a space between the chassis and the ground, wherein a piece of the feature information is collected by a bottom sensor translating parallel to the chassis, the bottom sensor being mounted on the bottom of the unmanned vehicle via a translating component, the translating component controls the bottom sensor to translate in a direction parallel to the chassis;
   determining whether the acquired feature information matches feature information of the bottom area of the unmanned vehicle collected at a most recent parking; and
   determining whether there is an object affecting traveling in the bottom area according to a matching result.

8. The apparatus according to claim 7, wherein the determining whether there is an object affecting traveling in the bottom area according to a matching result, comprises:
   determining that there is no object affecting traveling in the bottom area, in response to the acquired feature information matching the feature information of the bottom area of the unmanned vehicle collected at the most recent parking.

9. The apparatus according to claim 8, wherein the determining whether there is an object affecting traveling in the bottom area according to a matching result, further comprises:
   in response to the acquired feature information not matching the feature information of the bottom area of the unmanned vehicle collected at the most recent parking, performing following operations:

performing target identification on the acquired feature information to determine attribute information and position information of the target object included in the acquired feature information;

determining whether the attribute information and position information of the target object meets a preset condition of traveling affecting; and in response to affirmative, determining that there is an object affecting traveling in the bottom area.

10. The apparatus according to claim 7, the operations further comprising:

collecting the feature information of the bottom area of the unmanned vehicle, in response to receiving a parking instruction or detecting that a position of the unmanned vehicle has not changed during a preset time period; and storing the collected feature information.

11. The apparatus according to claim 7, the operations further comprising:

starting the unmanned vehicle, when there is no object affecting traveling in the bottom area; and issuing an alarm message, when there is an object affecting traveling in the bottom area.

12. The apparatus according to claim 7, wherein the feature information comprises: image information, laser point cloud data, millimeter wave data and ultrasonic data.

13. A start inspection system applied to an unmanned vehicle, the system comprising:

sensors, for collecting feature information of a bottom area of an unmanned vehicle, the bottom area including a chassis of the unmanned vehicle, ground blocked by the unmanned vehicle and a space between the chassis and the ground, wherein a piece of the feature information is collected by a bottom sensor translating parallel to the chassis, the bottom sensor being mounted on the bottom of the unmanned vehicle via a translating member;

a processor, for acquiring the feature information of the bottom area of the unmanned vehicle collected by the sensors, in response to receiving a start instruction, determining whether the acquired feature information matches feature information of the bottom area of the unmanned vehicle collected at a most recent parking, and determining whether there is an object affecting traveling in the bottom area according to a matching result.

14. The system according to claim 13, the system further comprising:

a controller, configured to issue an instruction to the translating member to control the sensors to translate in a direction parallel to the chassis.

15. The system according to claim 13, wherein the sensors comprises at least one of the following: a camera, a laser radar, a millimeter wave radar and an ultrasonic radar.

16. A non-transitory computer storage medium storing a computer program, which when executed by one or more processors, cause the one or more processors to perform operations, the operations comprising:

acquiring feature information in a bottom area of an unmanned vehicle, in response to receiving a start instruction, the bottom area including a chassis of the unmanned vehicle, ground blocked by the unmanned vehicle and a space between the chassis and the ground, wherein a piece of the feature information is collected by a bottom sensor translating parallel to the chassis, the bottom sensor being mounted on the bottom of the unmanned vehicle via a translating component, the translating component controls the bottom sensor to translate in a direction parallel to the chassis;

determining whether the acquired feature information matches feature information of the bottom area of the unmanned vehicle collected at a most recent parking; and determining whether there is an object affecting traveling in the bottom area according to a matching result.

17. The method according to claim 1, wherein the determining whether there is an object affecting traveling in the bottom area according to a matching result, comprises:

in response to the acquired feature information not matching the feature information of the bottom area of the unmanned vehicle collected during the most recent parking, performing following operations:

performing an image identification on a difference image of an acquired image of the bottom area of the unmanned vehicle and an image of the bottom area of the unmanned vehicle collected at the most recent parking, to determine attribute information and position information of a target object included in the acquired feature information;

determining whether the attribute information and position information of the target object meets a preset condition affecting the traveling; and in response to affirmative, determining that there is an object affecting the traveling in the bottom area.

* * * * *